US012386717B2

(12) United States Patent
Portman et al.

(10) Patent No.: US 12,386,717 B2
(45) Date of Patent: Aug. 12, 2025

(54) ENSEMBLE MODELS FOR ANOMALY DETECTION

(71) Applicant: Zeta Global Corp., New York, NY (US)

(72) Inventors: Danny Portman, Johns Creek, GA (US); Zachary Jones, Decatur, GA (US)

(73) Assignee: Zeta Global Corp., New York, NY (US)

( * ) Notice: Subject to any disclaimer, the term of this patent is extended or adjusted under 35 U.S.C. 154(b) by 83 days.

(21) Appl. No.: 18/232,303

(22) Filed: Aug. 9, 2023

(65) Prior Publication Data

US 2024/0054058 A1    Feb. 15, 2024

Related U.S. Application Data

(60) Provisional application No. 63/396,397, filed on Aug. 9, 2022.

(51) Int. Cl.
G06F 11/36    (2025.01)
G06F 11/14    (2006.01)
G06F 11/22    (2006.01)

(52) U.S. Cl.
CPC ...... G06F 11/2263 (2013.01); G06F 11/1476 (2013.01)

(58) Field of Classification Search
CPC ............. G06F 11/1476; G06F 11/1479; G06F 11/3604
USPC ..................................................... 714/25, 26
See application file for complete search history.

(56) References Cited

U.S. PATENT DOCUMENTS

| | | | | |
|---|---|---|---|---|
| 2020/0311603 | A1* | 10/2020 | Qiu ..................... | G06F 11/3452 |
| 2022/0253699 | A1* | 8/2022 | Hoshen .................... | G06N 3/08 |
| 2023/0325292 | A1* | 10/2023 | Ardel .................. | G06F 11/3058 |
| 2023/0410143 | A1* | 12/2023 | Retinraj ............. | G06Q 30/0244 |
| 2024/0046314 | A1* | 2/2024 | Zhu ..................... | G06Q 30/0272 |

OTHER PUBLICATIONS

Liu, Shigang et al. "Addressing the class imbalance problem in Twitter spam detection using ensemble learning", Dec. 13, 2016, Computers & Security, vol. 69, pp. 35-49 (Year: 2016).*

* cited by examiner

*Primary Examiner* — Chae M Ko
(74) *Attorney, Agent, or Firm* — Schwegman Lundberg & Woessner, P.A.

(57) ABSTRACT

The subject technology detects anomalies in media campaign configuration settings. The anomaly detection system may leverage one or more deep learning models to detect anomalies and identify particular configuration settings that contribute to the detected anomalies. In various embodiments, two or more of the deep learning models may be combined into an ensemble model that boosts the accuracy of anomaly predictions made by the anomaly detection system. The anomaly detection system may review the configuration settings of media campaigns during the configuration process and before the media campaigns run on a publication system in order to reduce the amount of unsuccessful campaigns and minimize the amount of wasted resources spent on running campaigns that have a low likelihood of achieving user defined goals.

20 Claims, 10 Drawing Sheets

ENSEMBLE MODELS FOR ANOMALY DETECTION

CLAIM OF PRIORITY

This patent application claims the benefit of priority, under 35 U.S.C. Section 119(e), to Portman et al, U.S. Provisional Patent Application Ser. No. 63/396,397, entitled "ENSEMBLE MODELS FOR ANOMALY DETECTION IN MEDIA CAMPAIGNS," filed on Aug. 9, 2022, which is hereby incorporated by reference in its entirety.

TECHNICAL FIELD

The subject matter disclosed herein generally relates to the technical field of machine learning used in a network-based computing environment. In particular, the disclosure recites improved approaches to anomaly detection and error reporting that leverages ensemble machine learning models and improved training methods for fine-tuning.

BACKGROUND

The present subject matter seeks to address technical problems existing in anomaly detection during the configuration process for digital media campaigns. The technology may detect anomalies, for example, campaign settings that are erroneous or usual and provide feedback to online users during the configuration process to facilitate more rapid deployment of campaigns and minimize the amount of post deployment troubleshooting. The technology described herein may also identify media campaigns that are unlikely to succeed before the campaigns are deployed to minimize the number of unsuccessful campaigns.

BRIEF DESCRIPTION OF THE DRAWINGS

Some embodiments are illustrated by way of example and not limitation in the figures of the accompanying drawings.

DETAILED DESCRIPTION

Figure 1:
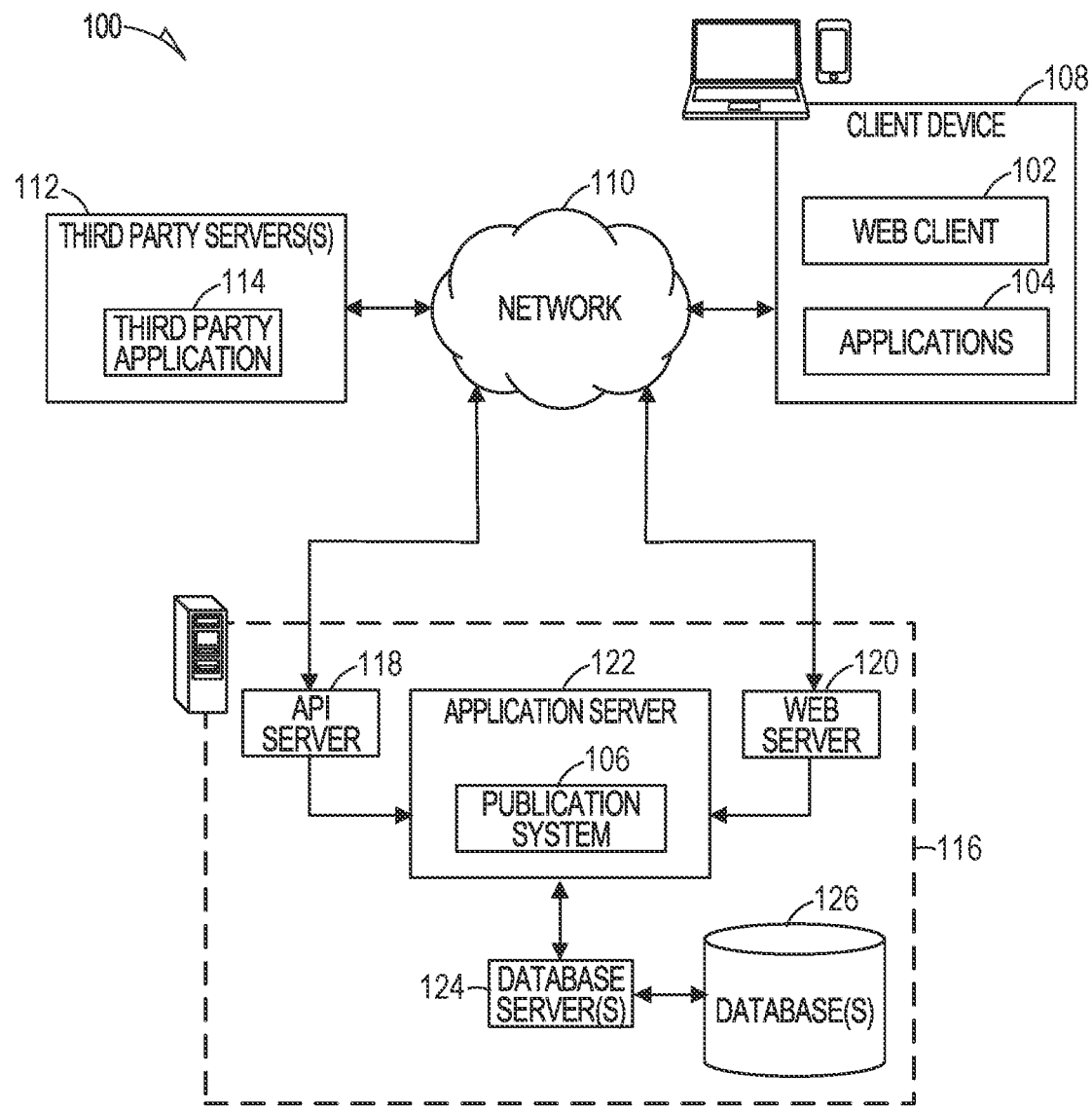
FIG. 1 is a block diagram illustrating a high-level network architecture, according to various embodiments described herein.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In digital publishing, users of a publication system such as a demand side platform (DSP) distribute media (e.g., text, image data, video content, audio content, streaming content, extended reality (XR) content including virtual reality (VR) content, augmented reality (AR) content, mixed reality (MR) content and any other form of XR content, and the like) over the Internet or other computer network. DSPs enable users to instantly buy placements for media on popular web pages and other high traffic online locations to support scalable media campaigns. In various embodiments, DSPs may run display advertising campaigns that publish digital media and other content to a targeted audience. As described in more detail below, the DSP may publish the media campaign programmatically by bidding on available placements for media included in inventory. For example, a placement may be a portion of a webpage, a portion of a mobile app display, a portion of a streaming video routine, and the like. The DSPs may simultaneously execute thousands of media campaigns to enable scalable media publishing capable of reaching millions of users in seconds. For each campaign, the DSPs may bid on placements, resolve successful bids, publish media to the procured placements, and process payment in a fraction of a second (e.g., less than 0.1 s, less than 0.01 s, less than 0.001 s, and the like) before a web page, streaming video file, or other online location including the placements loads on a user device.

The DSPs may also provide and display a configuration interface and/or one or more other user graphical user interfaces (GUIs) that allow online users to configure and track multiple media campaigns and upload media that will be published during each campaign. Based on inputs received in the configuration interface, each media campaign can be customized to the needs of the users by changing the media selected for publication and selecting one or more configuration settings. Exemplary configuration settings that may be selected by online users may include budgeting parameters such as a total budget for the campaign, pricing per unit of inventory and/or placement, margin charged on advertiser cost, and the like. Additional configuration settings that may be selected may include targeting parameters including geographic locations, audience demographics, audience attributes, and temporal restrictions. Online users may also specify one or more "goals" for their campaigns within the configuration interface by selecting an optimization model to apply to each campaign. The optimization models may maximize one or more of the click-through-rate, conversion rate, viewability rate, or another key performance indicator (KPI) selected for each campaign.

This framework offers enormous potential for customization of media campaigns but provides very little protection against configurations that are erroneous, unusual, or simply unlikely to succeed. The disclosed anomaly detection system uses an ensemble of deep learning models to predict unsuccessful media campaigns before they are deployed to the publication system. The ensemble models may also identify the specific campaign settings that cause the campaign to be unsuccessful. The problematic campaign settings may be flagged by the anomaly detection system and an error message including the flagged settings may be displayed in the configuration interface to enable online users to correct the erroneous settings.

Some illustrative examples of campaign anomalies that may be identified by the anomaly detection system are provided below. In one example, the anomaly detection system may determine a video streaming media campaign configured with $5.00 cost per mille, (CPM—i.e., cost per thousand impressions) pricing is anomalous and unlikely to succeed because the price floor for most video streaming auctions is much higher (e.g., $30+ CPM pricing for successful video streaming media campaigns). The anomaly detection system may also determine a targeting setting used to target customers of a retail clothing outlet is anomalous for a media campaign configured to target potential customers of a car manufacturer. The anomaly detection system may also determine a media campaign configured with 20% margin is anomalous because other campaigns with similar goals and targeting settings were configured with 70%+ margins. This campaign is likely to deliver fine, but the operator of the publication system will miss out on a substantial amount of potential revenue due to the anomalous margin configuration setting. The anomalies detected by the anomaly detection system may include configuration settings that negatively impact online users (e.g., cause campaigns to underperform, not run, or go over budget) and configuration settings that negatively impact the operator of a publication system (e.g., cause the operator to miss out on revenue or waste computational resources running ineffective campaigns).

The anomaly detection system improves the operating efficiency and performance of DSPs and other publication systems by ensuring these systems are only executing media campaigns that are likely to succeed. For example, the anomaly detection system may prevent a publication system from executing a media campaign that has a placement bid price setting that is below the pricing floor of auctions for the type of placements targeted by the campaign. The online user may receive an error message in the configuration interface that includes a prompt to increase the placement bid price before the campaign runs to ensure the publication system does not waste computational resources by submitting pointless bids that are too low to win placements. The anomaly detection system also reduces the amount of troubleshooting required to fix unsuccessful campaigns. By identifying erroneous and unusual campaign settings before the media campaign begins, the anomaly detection system minimizes the amount time and computational resources required to conduct an investigation to determine why a campaign that is already running is not meeting the user's goals. Additionally, the anomaly detection system reduces the amount of resources (e.g., media spend and computational resources required to secure placements and publish content) wasted on running erroneously configured or otherwise unsuccessful campaigns. In many cases, online users may spend hundreds of thousands or even millions of dollars on large scale media campaigns so the cost of executing an erroneously configured campaign that does not achieve any of the online user's goals can be significant even if the campaign is only running for a short period of time.

Currently DSPs and other publication systems ignore erroneous campaign configurations and force users to self-troubleshoot unsuccessful campaigns. The anomaly detection system improves the campaign success rate and user experience of these publication systems by identifying specific campaign settings that will limit the success of campaigns before the campaigns begin and flagging the problematic settings in a user interface so that the user can quickly modify the flagged settings. The anomaly detection system also improves traditional approaches of anomaly detection that rely on rudimentary statistical analysis of each campaign setting separately by leveraging deep learning models that consider the campaign settings jointly. The deep learning models learn the interactions between different campaign settings and the context of each setting within the campaign to identify complex anomalies that may be caused by multiple campaign settings and difficult to spot anomalies that may not be obvious even to expert users of the publication system. The anomaly detection system may boost its detection accuracy by combining multiple deep learning models to form ensemble models that make predictions based on the relative success of each individual model at analyzing different types of campaigns and identifying specific types of anomalies. The anomaly detection system may also be optimized using a fine tuning process that retrains the each model in the ensemble to align the anomaly detection rate with a specified target rate. One or more of the ensemble models may also be configurated to identify one or more campaigns settings that cause an anomaly. The anomaly detection system may provide the anomalous campaign settings to the publication system which can create an error message include the anomalous settings and a prompt to correct the settings. The error message may be displayed to online users of the publication system in the configuration interface.

With reference to FIG. 1, an example embodiment of a high-level SaaS network architecture 100 is shown. A networked system 116 provides server-side functionality via a network 110 (e.g., the Internet or WAN) to a client device 108. A web client 102 and a programmatic client, in the example form of a client application 104, are hosted and execute on the client device 108. The networked system 116 includes an application server 122, which in turn hosts a publication system 106 (such as a DSP) that provides a number of functions and services to the client application 104 that accesses the networked system 116. The client application 104 also provides a number of interfaces described herein (e.g., campaign setup user interfaces for selecting campaign configuration settings and correcting anomalous campaign configuration settings flagged by the anomaly detection system), which can present outputs to a user of the client device 108 and receive inputs thereto in accordance with the methods described herein.

The client device 108 enables a user to access and interact with the networked system 116 and, ultimately, the publication system 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An API server 118 and a web server 120 are coupled, and provide programmatic and web interfaces respectively, to the application server 122. The application server 122 hosts the publication system 106, which includes components or applications described further below. The application server 122 is, in turn, shown to be coupled to a database server 124 that facilitates access to information storage repositories (e.g., a database 126). In an example embodiment, the database 126 includes storage devices that store information accessed and generated by the publication system 106.

Additionally, a third-party application 114, executing on one or more third-party servers 112, is shown as having programmatic access to the networked system 116 via the programmatic interface provided by the API server 118. For example, the third-party application 114, using information retrieved from the networked system 116, may support one or more features or functions on a website or streaming platform hosted by a third party.

Turning now specifically to the applications hosted by the client device 108, the web client 102 may access the various systems (e.g., the publication system 106) via the web interface supported by the web server 120. Similarly, the client application 104 (e.g., a digital marketing "app") accesses the various services and functions provided by the publication system 106 via the programmatic interface provided by the API server 118. The client application 104 may be, for example, an "app" executing on the client device 108, such as an iOS or Android OS application, to enable a user to access and input data on the networked system 116 in an offline manner and to perform batch-mode communications between the client application 104 and the networked system 116. The client application 104 may also be a web application or other software application executing on the client device 108.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The publication system 106 could also be implemented as a standalone software program, which does not necessarily have networking capabilities.

Figure 2:
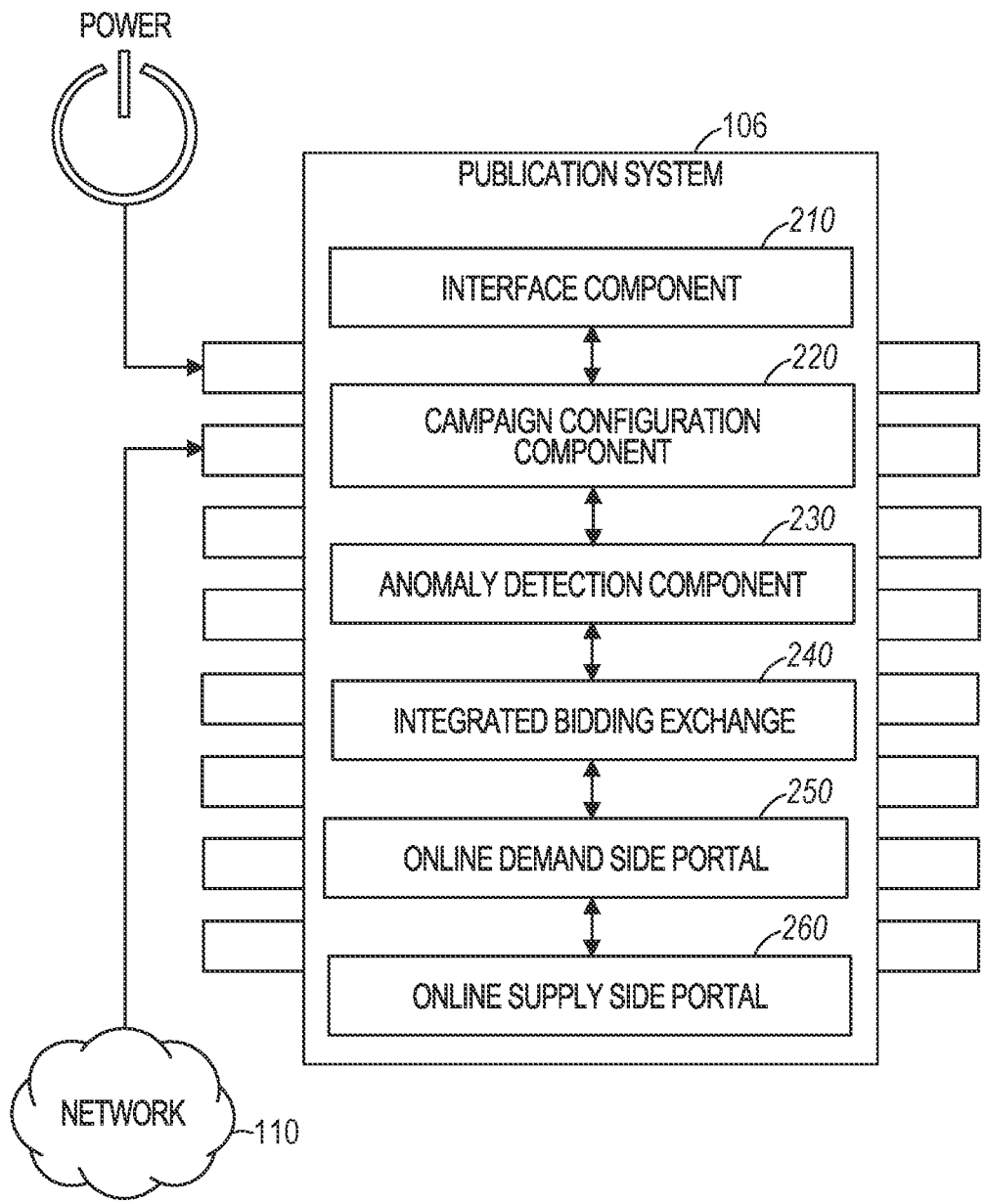
FIG. 2 is a block diagram showing architectural aspects of a publication system, according to various embodiments described herein.

FIG. 2 is a block diagram showing architectural details of a publication system 106, according to some example embodiments. Specifically, the publication system 106 is shown to include an interface component 210 by which the publication system 106 communicates (e.g., over a network 110) with other systems within the SaaS network architecture 100.

The interface component 210 is collectively coupled to one or more campaign configuration components 220 that operate to provide specific aspects of configuring and optimizing media campaigns deployed on the publication system 106, in accordance with the methods described further below with reference to the accompanying drawings. The campaign configuration components 220 are coupled to an anomaly detection component 230 that reviews the configuration settings of each media campaign, determines if a media campaign will be successful based on the configuration settings, and identifies anomalous configuration settings for the campaigns that are predicted to be unsuccessful.

The publication system 106 includes an integrated bidding exchange 240, an online demand side portal 250 accessible to a targeted content provider, and an online supply side portal 260 accessible to a publisher of content on the publication network 110. The bidding exchange 240 is communicatively coupled to the demand side portal 250 and the supply side portal 260 to present user interfaces enabling receipt of bids from a brand or other media provider for placement of media by a publisher at a specified location or domain in available inventory on the publication network 110. In some examples, the publication system 106 may be configured to present the targeted media to a consumer at the specified location or domain on the publication network. For example, the demand side portal 250 may be configured to reserve, upon resolving of a successful bid from the media provider, the specified location or domain for placement of media. The demand side portal 250 may then publish the piece of media included in the campaign at the reserved placements. Accordingly, users accessing the locations including the reserved placements may view and engage with the media. A user may include a user as described above, for example an online consumer seeking actionable media on the publication network 110. In some examples, the publication system 106 is further configured to process a transaction between the media provider and the publisher based on the presentation or a viewing of the targeted media by the consumer, or a third party.

It should be understood that the publication system 106 may include one or more instances of each of the components. For example, the publication system 106 may include multiple instances of the demand side portal 250 and multiple instances of the supply side portal 260 with each instance being operated by a different targeted media provider and different media publisher respectively. It should also be understood that the process for bidding for placement of media at a specified location or domain and the process for providing the targeted media for display may be partially or completely programmatic. For example, a demand side API or other logic included in the online demand side portal 250 may programmatically bid on media placements, resolve successful bids to reserve placements, and publish media at the reserved placements programmatically in a faction of a second to support multiple, simultaneous high volume media campaigns.

In various embodiments, the demand side portal 250 may be configured based on one or more configuration settings of the media campaign. For example, the demand side portal 250 may be programmed to target placements at particular locations that satisfy budgeting and/or targeting parameters included in the campaign configuration settings. The campaign configuration component 220 may also track campaign performance in real time by recording the number of displays, views, impressions, clicks, conversions, responses, and other interactions with the published media as impression data. The campaign configuration component 220 may then dynamically update the bid parameters of the demand side portal 250 in response to the impression data in order to achieve the user's goals for the media campaign. For example, the bid amounts and/or number of bids submitted by the demand side portal 250 may be increased to boost the number of views or clicks of campaign media. The campaign configuration component 220 may also update the targeting parameters of the configuration settings in response to impression data to better achieve the user's goals. For example, particular demographic constraints (e.g., target females ages 25-35) may be added to the targeting parameters in response to observing a high number of impressions from a particular demographic in the impression data. The updated targeting parameters may configure the demand side portal 250 to reserve more placements at locations having traffic that contains a significant number of users within a particular demographic.

In various embodiments, the publication system 106 may use impression data to enrich a consumer identity profile stored in a data cloud or other database 126. For example, the publication system 106 may collect impression data capturing engagement of the consumers with the targeted media. The impression data may include metadata used to identify the consumers interacting with the targeted media. For example, the identification metadata may include one or more unique identifiers (e.g., email address, IP address, device identifier, and the like) associated with a consumer. The publication system 106 may resolve an identity and geographic location for the consumers based on the one or more datasets stored in the data cloud. In various embodiments, the identity and geographic location for the consumers may be resolved by matching one or more pieces of identification metadata with known identifiers for the consumers included in a consumer attributes profile stored in an identity graph, data cloud, or other database. The consumer attributes profile may include location data (e.g., a zip code, street address, or other known geographic location for the consumer) and one or more intender attributes. The intender attributes may include individual metrics that may be used to determine an intent of a consumer to purchase a product, visit a store, view an ad, or perform another action. For example, the intender attributes may include demographic information and other consumer data as well as individual level brand propensities (e.g., a tendency of the consumer to shop at store of a particular brand, purchase a particular brand of athletic shoes or other goods, consume content on YouTube or another particular media publisher by a particular band, and the like), brand affinity scores (e.g., metrics that describe how frequently and/or consistently consumers engage with particular brands, for example, how often consumers purchase products made by the brand, click or view ads or emails sent by the brand, visit a particular brand website, and the like), product propensities (e.g., the types of products or services consumers frequently and/or consistently buy or show interest in), and the like. The intender attributes may also include semantic codes (e.g., key words or important terms) summarizing the content of web pages and other digital media browsed by consumers. The intender attributes may also include an attitude or behavioral propensity (e.g., materialistic, athletic, health conscious, frugal, aggressive, or other personality trait) or a channel propensity (e.g., email, web page display, mobile ad, connected tv media, or other marketing channel preferred by a consumer).

The intender attributes and the geographic locations for the consumers may be extracted from the attribute profiles and provided to the campaign configuration component 220. In various embodiments, the campaign configuration component 220 may include a geographic insights generator that may identify the geographic location for each of the consumers and group the consumers by geographic location. The geographic insights generator may then determine geo-specific intender attributes for consumers located within one or more pre-selected locations. To target specific consumers and/or geographic regions, one or more geo-specific intender attributes and/or a city, zip code, or other location may be input into the campaign configuration component 220 as targeting parameters.

For example, intender attributes that identify particular brands, products, types of content, and marketing channels that resonate most with a particular segment of consumers (e.g., consumers within a particular age range or other demographic, consumers located in a particular geographic area, and the like) may be displayed to users within the campaign configuration component 220 and added as targeting parameters. The campaign configuration component 220 may configure the demand side portal 250 to access the bid exchange 240 to bid and/or update a previous bid for a media placement based on the updated targeting parameters. In various embodiments, the campaign configuration component 220 may also dynamically update the bid parameters of the demand side portal 250 based on the impression data and the optimization model selected for the campaign. For example, the campaign configuration component 220 may modify the bid parameters in response to impression data indicating the campaign performance is worse for the goals of the campaign optimization model (e.g., viewability rate) relative to other KPIs measured from impression data (e.g., conversion rate, click-through rate, etc.). For example, if impression data indicates the campaign has a high click-through rate relative to the campaign's viewability rate, the campaign configuration component 220 may remove one or more of the targeting parameters to configure the demand side portal 250 to bid on a larger volume of less targeted placements in order to maximize the viewability rate for the campaign.

Figure 3:
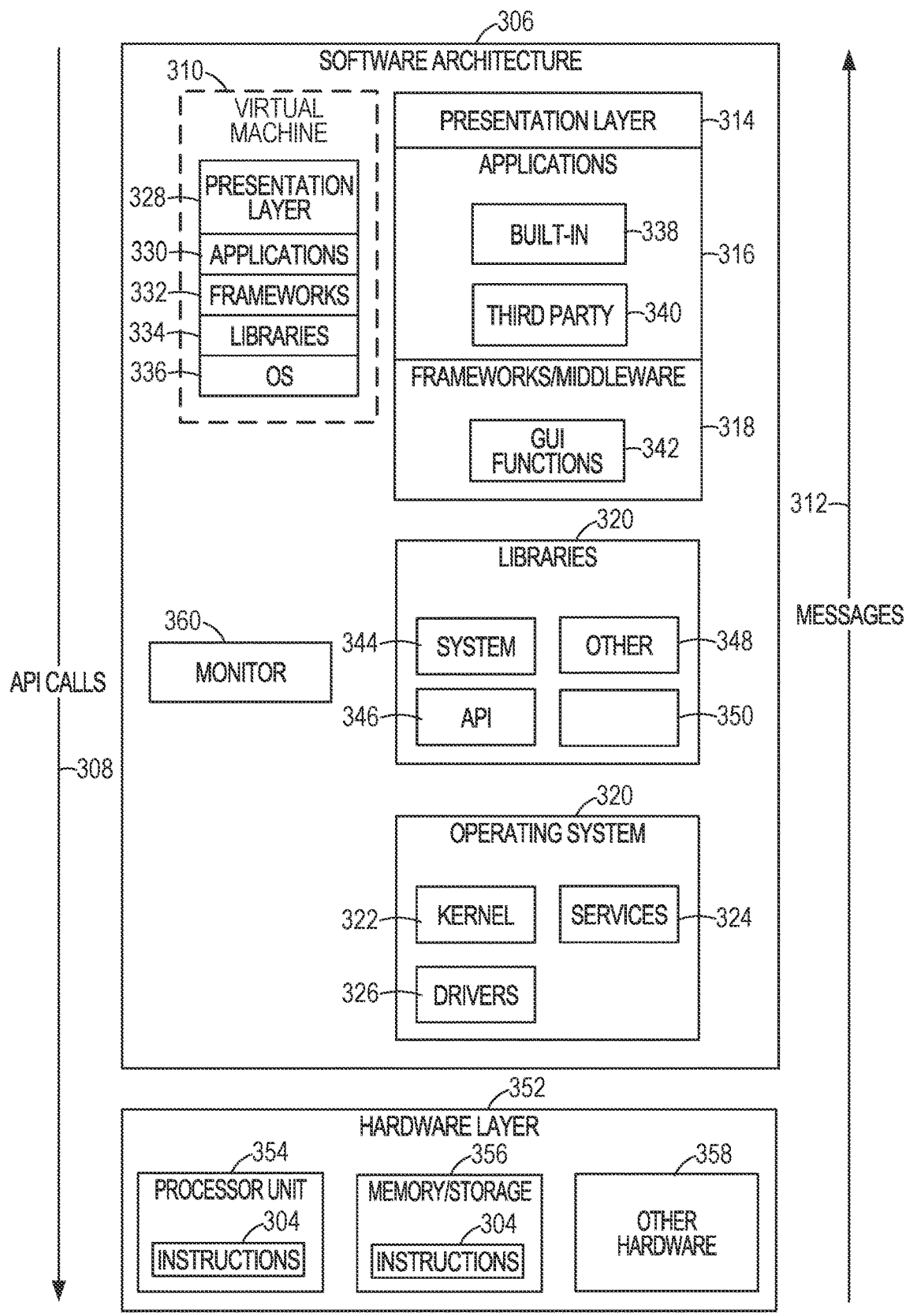
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306, and it will be appreciated that many other architectures may be implemented to facilitate the functionality described herein. The software architecture 306 may execute on hardware such as a machine 400 of FIG. 4 that includes, among other things, processors 404, memory/storage 406, and input/output (I/O) components 418. A representative hardware layer 352 is illustrated and can represent, for example, the machine 400 of FIG. 4. The representative hardware layer 352 includes a processor 354 having associated executable instructions 304. The executable instructions 304 represent the executable instructions of the software architecture 306, including implementation of the methods, components, and so forth described herein. The hardware layer 352 also includes memory and/or storage modules as memory/storage 356, which also have the executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, frameworks/middleware 318, applications 316, and a presentation layer 314. Operationally, the applications 316 and/or other components within the layers may invoke API calls 308 through the software stack and receive a response as messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (e.g., the operating system 302 in FIG. 3) and typically, although not always, has a virtual machine monitor 360, which manages the operation of the virtual machine 310 as well as the interface with the host operating system (e.g., the operating system 302). A software architecture executes within the virtual machine 310 such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
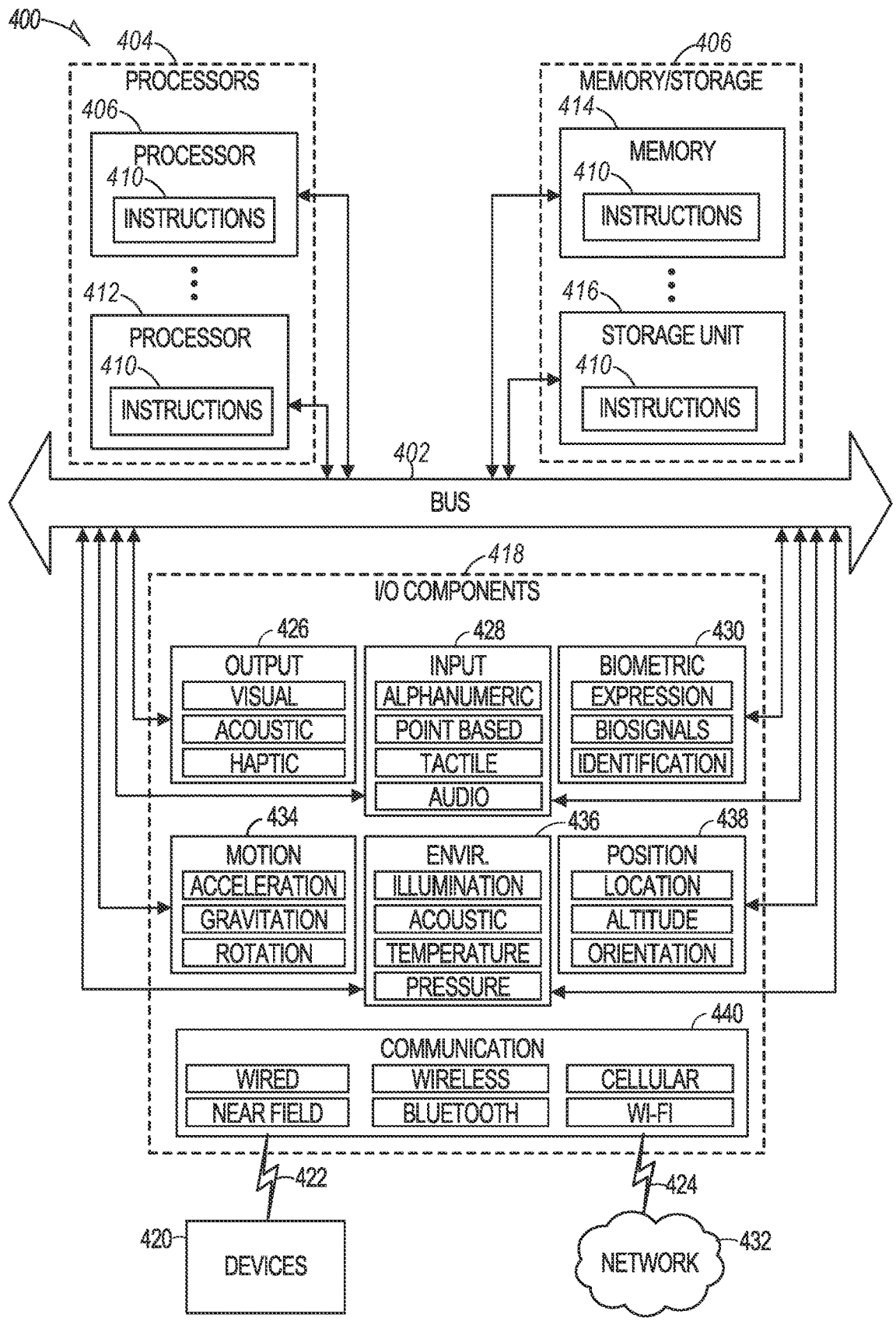
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a non-transitory machine-readable medium (e.g., a non-transitory machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404 (including processors 408 and 412), memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion, and the grouping is in no way limiting. In various example embodiments, the I/O components 418 may include output components 426 and input components 428. The output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438, among a wide array of other components. For example, the biometric components 430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422, respectively. For example, the communication components 440 may include a network interface component or other suitable device to interface with the network 432. In further examples, the communication components 440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geo-location, location via Wi-Fi® signal triangulation, location via detecting an NFC beacon signal that may indicate a particular location, and so forth.

Some examples provide machine learning models to detect anomalies in media campaign configuration settings. The machine learning models may be used to identify specific campaign configuration settings that are erroneous, unusual, or anomalous so the settings that cause the campaigns to be unsuccessful may be fixed before running the campaign. These examples improve the functionality of DSPs and other computers (e.g., machine 400, software architecture, and the like) used to publish media online by increasing the likelihood media campaigns will be successful and decreasing the amount of computational resources (e.g., processor, memory, network, and the like) and financial resources wasted on running campaigns that are unable to meet their user's goals.

Compared with previous approaches of anomaly detection that rely on rudimentary statistical analysis of individual campaign settings, the anomaly detection system described herein leverages deep learning models that consider the campaign settings jointly. In various embodiments, deep belief network (DBN) models, generative adversarial network (GAN) models, one-class deep support-vector data description (OCD-SVDD) models, and other deep learning models included in the anomaly detection system may learn the interactions between different combinations of campaign configuration settings and the context of each setting within the campaign as a whole to identify complex anomalies that may be caused by multiple configuration settings and difficult to spot anomalies that may not be obvious even to expert users of the publication system. The anomaly detection system boosts its detection accuracy by combining multiple deep learning models into ensemble models that make predictions based on the relative success of each individual model at analyzing different types of campaigns and identifying specific types of anomalies.

To detect media campaign anomalies, a set of input campaign configuration settings (e.g., configuration settings for a newly created media campaign received from the configuration interface) are passed through each deep learning model. In various embodiments, an OCD-SVDD model and the discriminator portion of the GAN model directly output a classification of "not anomalous" or "anomalous" for the set of input campaign configuration settings. The GAN model and DBN model may also be configured to output a numerical probability (e.g., a percentage, a numerical value between 0 and 1, and the like) that the campaign is anomalous. The probability generated by each of the models may be compared to a pre-determined anomaly threshold to determine a classification for the input campaign configuration settings. For example, an anomaly threshold may be set to 0.8 and campaigns having probabilities generated by the GAN model and/or DBN model that exceed 80% may be classified as anomalous. The outputs of these three models may be ensembled using a weighted voting process. In various embodiments, each of the three models vote on a verdict, and the votes are weighted by the accuracy of the model as measured on a testing dataset. The weighted votes are then aggregated to produce a prediction.

To determine the campaign settings that cause the campaign anomaly, the anomaly detection system may consult the DBN model. In various embodiments, the configuration of the visible units in the visible layer and the hidden units in one or more of the hidden layers may be used to identity the anomalous campaign settings. The probability of observing the given value for each input setting in an non-anomalous campaign may be determined by calculating the sum of the weights connecting the visible unit for the configuration setting to its corresponding hidden unit, the visible unit biases, the hidden unit basis, the visual unit states, and the hidden unit states, determining probability distribution for each possible configuration of the visible and hidden units for the configuration setting, and mapping the configuration of the visible state determined for each input setting within the probability distribution. The individual setting with the lowest probability based on the visible and hidden units of the DBN may be identified as the cause of the anomaly.

The DBN may also be used to determine a joint probability distribution between all combinations of two individual campaign configuration settings. The joint probability distribution may be determined by calculating the sum of the weights connecting the visible and hidden units for all possible pairs of configuration settings. For example, the weights connecting the visible and hidden units for campaign setting 1 (C1) and the weights connecting the visible and hidden units for campaign setting 2 (C2) may be determined. This process may be repeated for the combination of C1 and every other input campaign setting (CN), the combination of C2 with every other input campaign setting (CN) and so forth until the connecting weights for each possible combination of two configuration settings is determined. The visible unit biases, the hidden unit basis, the visual unit states, and the hidden unit states for each combination of campaign settings may also be calculated. A joint probability distribution for each pair of configuration settings may be determined based on the possible configuration of the visible and hidden units for each combination of settings represented by the calculated values. The joint probability distribution may be used to determine the likelihood an individual setting contains an anomaly by calculating the marginal distributions for each setting which show how the probability the setting is included in a non-anomalous campaign changes given the value of the other setting included in the distribution. The marginal probability for the value of each of the input settings may be determined across of the joint probability distributions and the marginal probabilities for each input setting may be aggregated, for example, by determining an average probability. The individual setting with the lowest marginal probability across all of the joint probability distributions (e.g., lowest average probability) may be identified as the cause of the anomaly.

The joint probability distribution may also be used to determine the likelihood different combinations of settings contain an anomaly. To determine a combination of campaign configuration settings that are most likely to cause an anomaly, the joint probability distributions for every combination of two configuration settings may be determined to show how the probability a pair of settings is included in a non-anomalous campaign changes given different values of each of the settings. The probability for the value of each pair of input settings may be determined from the joint probability distributions. The pair of configuration settings having the lowest conditional probability may be identified as the cause of the anomaly.

The number of visible units in the visible layer of the DBN and the number of hidden units in the hidden layer connected to the visible layer may be configured to dynamically adjust to match the number of campaign configuration settings input into the model so that probability distribution for each individual setting may be determined based on the configuration of the corresponding visible and hidden units. Leveraging the probability distributions of the DBN model to identify individual and/or combinations of configuration settings enables the anomaly detection system to accurately identify the cause of each detected anomaly without having to train an additional model. The joint probabilities that may be determined from the outputs of the DBN also enable combinations of settings to be evaluated jointly which allows the detection of more complex anomalies and makes it easier for online users to correct all of the anomalous campaign settings at once instead of one at a time. The hidden layer and visible layer architecture of the DBN also ensures the DBN model does not need to be specially trained or retrained for the task of identifying anomalous campaign settings. Minimizing the number of models and amount of training operations required for each model improves the efficiency of the anomaly detection system by reducing the amount of computational resources (e.g., processing power, memory, electricity, and the like) and financial cost required to develop and maintain the system.

Figure 5:
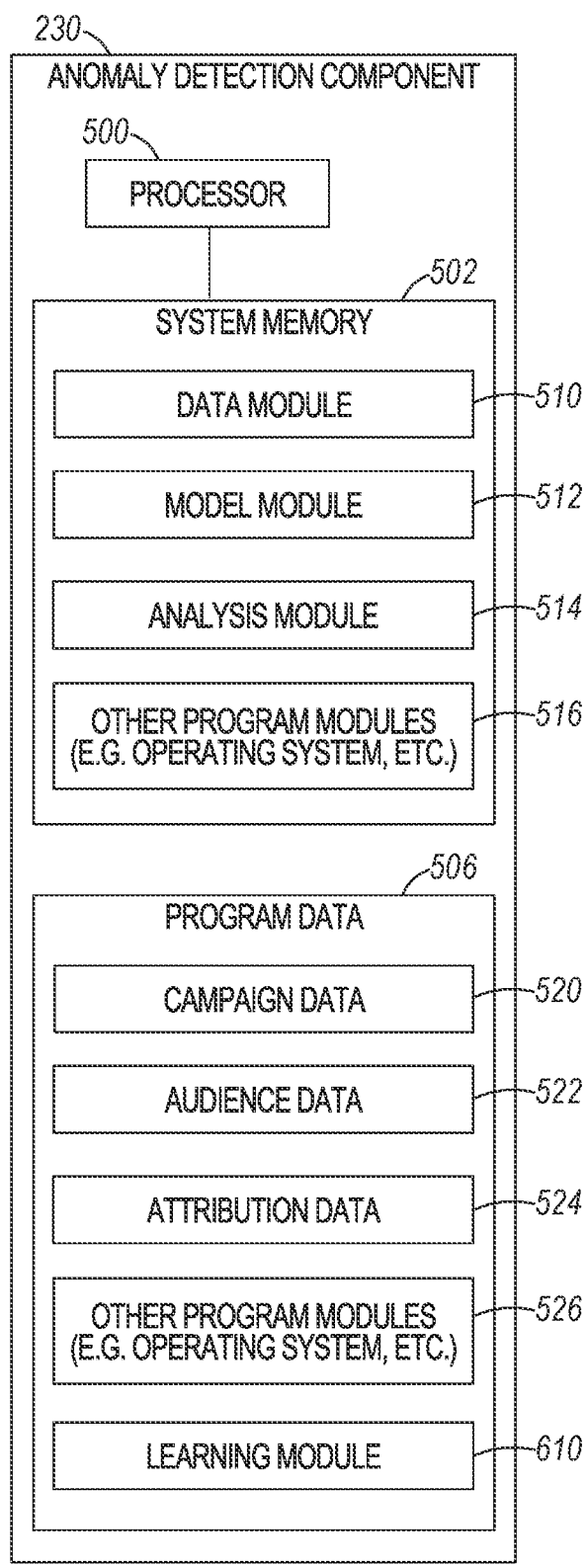
FIG. 5 depicts aspects of an integrated anomaly detection component, according to various embodiments described herein.

With reference to FIG. 5, the anomaly detection component 230 may include at least one processor 500 coupled to a system memory 502, as shown by the block diagram in FIG. 5. The system memory 502 may include computer program modules and program data 506. In this implementation, program modules may include a data module 510, a model module 512, an analysis module 514, and other program modules 516 such as an operating system, device drivers, and so forth. Each module 510 through 516 may include a respective set of computer-program instructions executable by one or more processors 500.

This is one example of a set of program modules, and other numbers and arrangements of program modules are contemplated as a function of the particular design and/or architecture of the anomaly detection component 230. Additionally, although shown as a single anomaly detection component 230, the operations associated with respective computer-program instructions in the program modules could be distributed across multiple computing devices. Program data 506 may include campaign data 520, audience data 522, attribution data 524, and other program data 526 such as data input(s), third-party data, and/or others. In some examples, anomaly detection component 230 includes a learning module 610, described further below.

In various embodiments, configuration settings for previously run media campaigns that have successful outcomes (e.g., achieved one or more KPIs or other goals) may be assembled into training samples. For example, one or more training samples of previously run media campaigns that achieved a user defined click-through-rate, conversion rate, viewability rate, or other KPI may be selected as training samples. Media campaigns may also be selected based on other campaign configuration settings including budget and/or targeting parameters. For example, media campaigns that achieved one or more goals had a budget within a defined threshold or targeting audiences having one or more defined characteristics may be selected for one or more training samples. The learning module 610 may generate training data for the machine learning models by aggregating the campaign settings for each selected campaign. The configuration settings for each campaign included in the training samples may be encoded and/or normalized to generate a set of model features.

The learning module 610 may use the model features to train various machine learning models to detect anomalous campaigns (i.e., campaigns that are unlikely to succeed) and identity the particular campaign settings that cause the anomaly (i.e., the settings that reduce the likelihood the campaign will be successful). For example, the learning module 610 may train an OCD-SVDD model and a GAN model to predict whether a media campaign is anomalous. The learning module may also train a DBN model that outputs a probability that a campaign is anomalous. The probability output by the DBN model may be compared to an anomaly threshold in order to generate a prediction of anomalous or non-anomalous. The outputs of the three models may then be combined using a weighted voting process that applies voting weights to the classifications generated by the individual models to generate an ensembled prediction. The voting weights may be determined based on the anomaly detection accuracy of each model on a test sample of previously run campaigns with known outcomes. The more accurately a model detects anomalies in the campaigns included in the test sample the greater the magnitude of the weight that is applied to the prediction determined by the model. Combining three models into one ensemble model boosts the overall classification accuracy of the anomaly detection system by leveraging the ability of each model to specialize in detecting different types anomalies in different types of campaigns.

Figure 6:
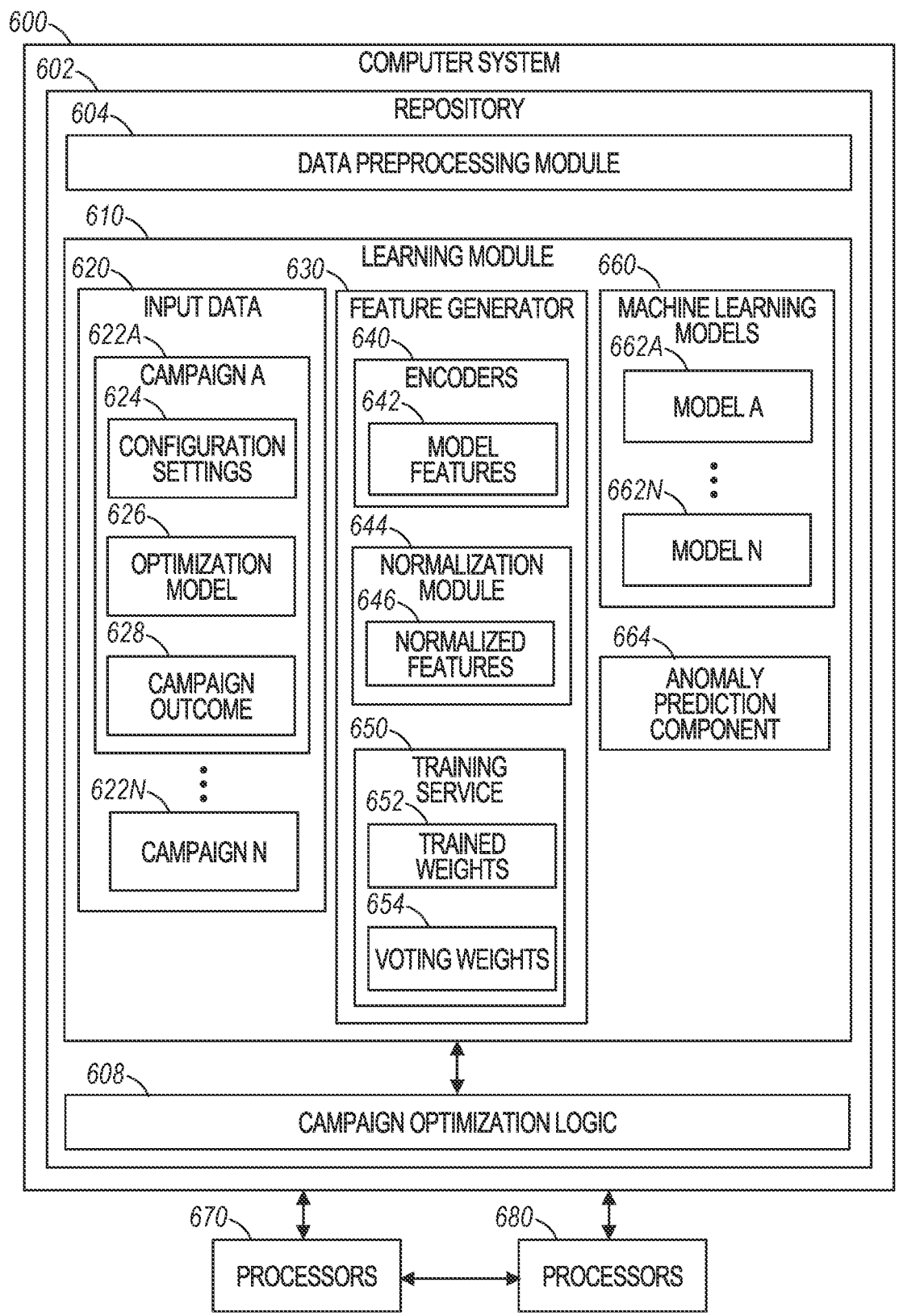
FIG. 6 depicts aspects of a learning module, according to various embodiments described herein.

FIG. 6 is a block diagram illustrating more details of the learning module 610 in accordance with one or more embodiments of the disclosure. The learning module 610 may be implemented using a computer system 600. In various embodiments, the computer system 600 may include a repository 602, a publishing engine 680, and one or more computer processors 670. In one or more embodiments, the computer system 600 takes the form of the application server 122 described above in FIG. 1 or takes the form of any other computer device including a processor and memory. In one or more embodiments, the computer processor(s) 670 takes the form of the processor 500 described in FIG. 5.

In one or more embodiments, the repository 602 may be any type of storage unit and/or device (e.g., a file system, database, collection of tables, or any other storage mechanism) for storing data. Further, the repository 602 may include multiple different storage units and/or devices. The multiple different storage units and/or devices may or may not be of the same type or located at the same physical site. The repository 602 may include a data preprocessing module 604, the learning module 610, and campaign optimization logic 608.

The data preprocessing module 604 includes programing instructions for performing Extract, Transform, and Load (ETL) tasks. The ETL jobs process campaign data (e.g., configuration settings, campaign outcomes including campaign results and/or campaign performance, and the like) for media campaigns previously run on the publication system. The learning module 610 may select campaigns to include in input data 620 for training the machine learning models 660 based on an outcome of each previously run campaign. For example, the learning module 610 may select campaigns that meet or exceed one or more defined KPIs (e.g., click-through-rate, conversion rate, viewability rate) and/or have other successful campaign outcomes 628. Campaigns having successful campaign outcomes 628 may also include campaigns that meet one or more defined budget constraints. For example, successful campaigns may include campaigns that spend their allocated budget within the maximum and minimum margin constraints of the DSP or other publication system. These successful campaigns publish media at a rate that consumes the total allocated budget for the campaign while also achieving an acceptable margin for operating the publication service (e.g., difference between the DSP operator's cost for media placements and the amount of fees paid to run the campaign).

The successful campaigns identified by the learning module 610 are included in input data 620 that is fed into the feature generator 630. The input data 620 may include data for multiple campaigns 622A, . . . , 622N and the data for each campaign may include the configuration settings 624 for the campaign as well as the optimization model 626 selected for the campaign. The input data may also include the outcome 628 for each campaign. In various embodiments, to build targeted training samples, the learning module 610 may filter the campaigns 622A, . . . , 622N based on one or more of the configuration settings 624, optimization module 626, and or campaign outcomes 628. For example, the learning module may select campaigns that have the same optimization model 626 (click-through-rate, conversion rate, viewability rate, etc.) or target audiences having one or more of the same characteristics. Restricting training samples to campaigns of the same type may improve the accuracy of the machine learning models 660 by enabling them to specialize in particular types of media campaign (e.g., campaigns that maximize viewability rate or publish content targeting a particular audience).

In various embodiments, the learning module 610 may generate multiple machine learning models 660, with each model 662A, . . . , 662N specializing in a different type of media campaign. At runtime, the learning module 610 may automatically select the model 662A, . . . , 662N that specializes in the type of media campaign being reviewed by the anomaly detection system. For example, the learning model may select model A 662A that is trained on campaigns with a visibility rate optimization model to review campaigns configured to have a visible rate optimization model. The machine learning models 660 may also include models 662A, ..., 662N that are trained on a variety of campaign types to enable the same models to recognize a wider variety of anomalies and efficiently review multiple types of media campaigns.

The one or more encoders 640 included in the feature generator 630 may encode the configuration settings 624 of each of the campaigns 662A, ..., 662N included in input data 620 as model features 642 used to train the machine learning models 660. The configuration settings 624 may include a combination of multiple categorical settings and multiple numeric settings. For example, categorical settings may include the pricing type, one or more categories of pre-determined KPIs and other campaign goals, the optimization model 626 selected for the campaign, and various targeting parameters including geographic location, demographics and other identity attributes, defined message cadence and other temporal targeting restrictions, and the like. The numeric settings may include budgeting parameters (e.g., a total budget, pricing per unit of inventory, margin charged on advertiser cost), the value of KPIs and other campaign goals, and other numeric values. A normalization module 644 may determine normalized features 646 for the numeric settings by calculating a scaled value (e.g., a value between −1 and 1) for each of the of the numeric variables (e.g., each unique value of a particular numeric setting). For example, each unique budget amount in the campaign settings 624 may be multiplied by a scaling factor to determine normalized features 646 (e.g., values between −1 and 1) for each budget amount. One or more encoders 640 may then encode the normalized features 646 into an encoded vector for the numeric settings.

The one or more encoders 640 may also determine model features 642 for each categorical setting. In various embodiments, the categorical settings may not have an ordinal relationship so the encoder 640 may apply one hot encoding to the categorical settings. The categorical settings may be one hot encoded by first assigning each categorical variable (e.g., each unique value) for a particular categorical setting an integer value. For example, to one hot encode the pricing type configuration setting, a value of "1" may be assigned to the cost per thousand impressions (CPM) pricing type, a value of "2" may be assigned to the average dynamic cost per thousand impressions (dCPM), and a value of "3" may be assigned to an impressions free of charge (bonus) impressions setting. A one hot encoding may be applied to this integer representation by removing the integer encoded variable and adding a new binary variable for each unique integer value (e.g., "1,0,0" for the integer value of "1", "0,1,0" for the integer value of "2" and "0,0,1" for the integer value of 3). This one hot encoding process may be repeated for each categorical setting that does not have an ordinal relationship. The encoders 640 may also encode categorical settings that have an ordinal relationship (i.e., are in number order) by applying an integer encoding that converts each unique value for the category setting into an integer. The encoders 640 may determine encoded vectors for the categorical settings that include the encoded categorical settings for each campaign 622A, ..., 622N.

The encoded vectors for the categorical settings and the encoded vectors for the numeric settings may be aggregated into composites vectors. The composite vectors may include a matrix, array, or other numerical representation of the campaign configuration settings 624 for the campaigns included in input data 620. For example, the feature generator 630 may concatenate the encoded vectors for the numeric and categorical settings into a single n-dimensional composite vector for each campaign. The feature generator 630 may filter campaigns based on one or more configuration settings 624, optimization models 626, and or campaign outcomes 628 and aggregate the composite vectors for each of the campaigns identified by the filtering to generated targeted training datasets that may be used to train models that specialize in anomaly detection for a specific type of campaign. For example, models may be trained to specialize the most recent campaigns, campaigns with a particular optimization model, campaigns having a particular type of media content, campaigns for clients in a particular industry, campaigns with a minimum budget amount, campaigns targeting individuals of a particular demographic within a pre-determined geographic location, and the like. The training datasets generated by the feature generator 630 are provided to the training service 650 that trains the machine learning models 660.

In various embodiments, the training service 650 may include one or more training models that implement a training process used to train one or more machine learning models 660. The training models may perform the training processes to determine trained weights 652 that are included in the machine learning models 660. For example, the training service 650 may determine trained weights 652 for one or more coefficients in an anomaly detection based objective function of an OCD-SVDD model for anomaly detection. During each training step, the OCD-SVDD model may determine an m-dimensional representation of the campaign settings for an input n-dimensional composite vector included in the training sample. During each training epoch, all of the m-dimensional representations output by the OCD-SVDD model may be placed in an m-dimensional hypersphere with a defined radius calculated based on the observed loss value for the model's objective function. To determine the trained weights 652 for the model, the training service 650 may evaluate the size of the radius of the m-dimensional hypersphere and modify the trained weights 652 of the OCD-SVDD model based on a gradient determined from the loss value until the radius of the m-dimensional hypersphere is within an acceptable range. In various embodiments, a gradient decent algorithm may be used to determine a gradient that is used to modify the weights of one or more coefficients of the OCD-SVDD's objective function in a direction that will minimize the loss value.

Figure 7:
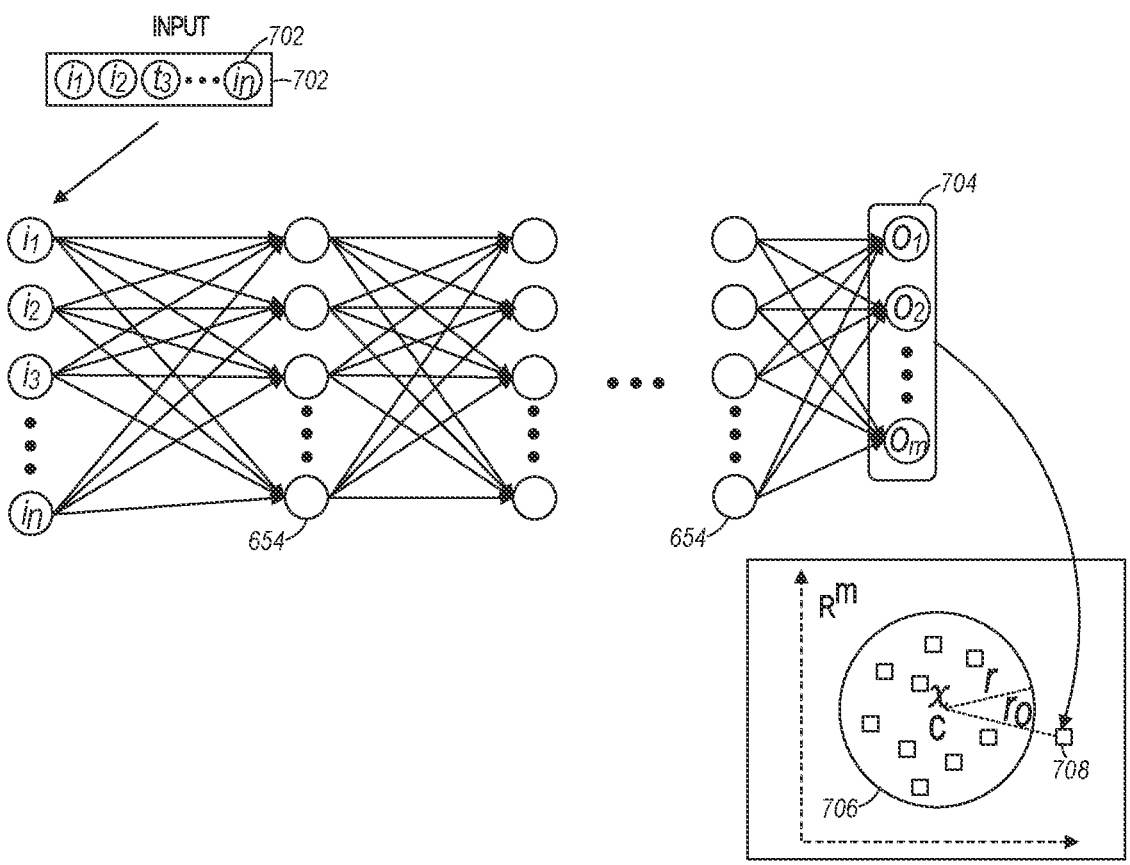
FIG. 7 illustrates more details of a deep one-class support-vector data description model, according to various embodiments described herein.

At runtime, the OCD-SVDD model may identify anomalous campaigns by determining if the m-dimensional representation determined for a composite vector of a target campaign is contained within the m-dimensional hypersphere determined during the training process. FIG. 7 illustrates more details of the anomaly detection process of the OCD-SVDD model. At runtime, feature vector 702 for a target campaign is fed into the model. The OCD-SVDD model determines an m-dimensional representation of the campaign settings 704 encoded in the composite feature vector. The m-dimensional representation 704 is plotted in the m-dimensional hypersphere 706 determined during training. To determine if the campaign is anomalous, the distance between the center (c) of the m-dimensional hypersphere and a plot of the m-dimensional campaign representation is compared to the radius (r) of the m-dimensional hypersphere 706. If the distance ($r_o$) between the center (c) and the plot of the m-dimensional campaign representation exceeds the radius (r) of the hypersphere (e.g., $r_o$>r), the campaign is classified as an anomalous campaign 708. If the distance ($r_o$) between the center (c) and the plot of the m-dimensional campaign representation does not exceed the radius (r) of the hypersphere (e.g., $r_o<r$), the OCD-SVDD model does not detect an anomaly in the target campaign and the campaign is classified as "not anomalous".

Figure 8:
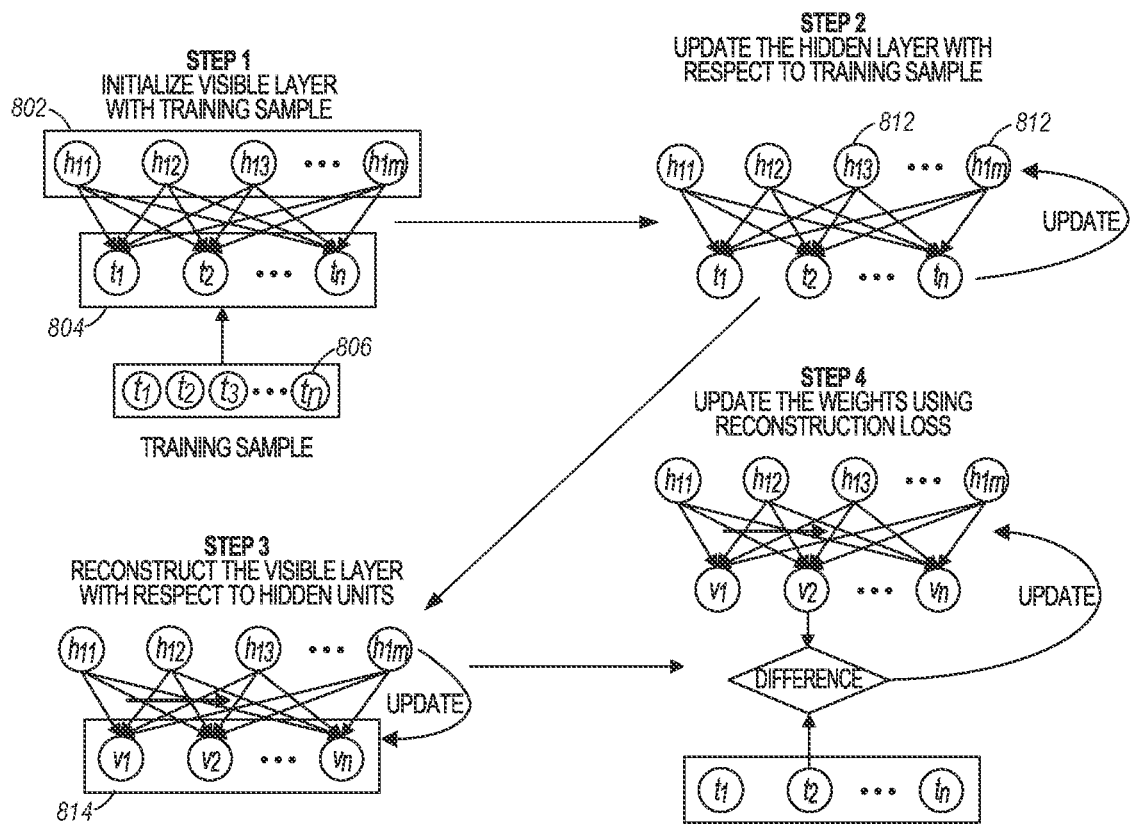
FIG. 8 illustrates more details of a deep belief network model, according to various embodiments described herein.

Referring back to FIG. 6, the training service 650 may also execute a contrast divergence training algorithm to train one or more DBN models. FIG. 8 illustrates an example contrast divergence training process for the DBN models. During each training step, the visible layer of the DBN model is initialized with a training sample 806 (e.g., a composite vector determined for a campaign in the training sample) at step one. During the initialization, the visible layer may determine a visible layer representation 804 of the composite vector included in the training sample. At step two, the weights of the hidden units 812 included in the hidden layer 802 are updated based on the training sample 806. At step three, the hidden layer 802 reconstructs the original visible layer representation 804 with respect to the weights in the hidden units 812 to form a reconstructed n-dimensional representation of the configuration settings of the training sample (e.g., a reconstructed composite vector 814). At step four, a difference between the reconstructed composite vector 814 and the original visible layer representation 804 of the composite vector is calculated. The weights of the hidden units 812 are then updated based on the calculated difference (e.g., adjusted in the direction of a gradient determined from reconstruction loss) to minimize the amount of reconstruction loss. During each training epoch, steps one through four of the contrast divergence process may be repeated for each feature vector included in the training data to enable the trained weights 652 of the hidden units 812 capture a wide variety of meaningful features from the different campaigns included in the training data.

After one or more training epochs, the accuracy of DBN model may be evaluated using a test sample including composite vectors determined for campaigns that have not been seen by the model previously (e.g., composite vectors that were not included in the training data). The performance of the DBN model may be evaluated by calculating a difference between the reconstructed composition vector 814 the original visible layer representation 804 for each campaign included in the test sample. If the composite difference between the reconstructed representations 814 and original visible layer representations 804 determined for test sample exceeds a predetermined threshold difference value, the DBN model may be retrained to further adjust the weights of the hidden units 812. If the composite difference between the reconstructed representations 814 and original visible layer representations 804 for the test sample exceeds a predetermined threshold difference value, the trained DBN model may be used detect anomalies in input media campaigns.

Figure 9:
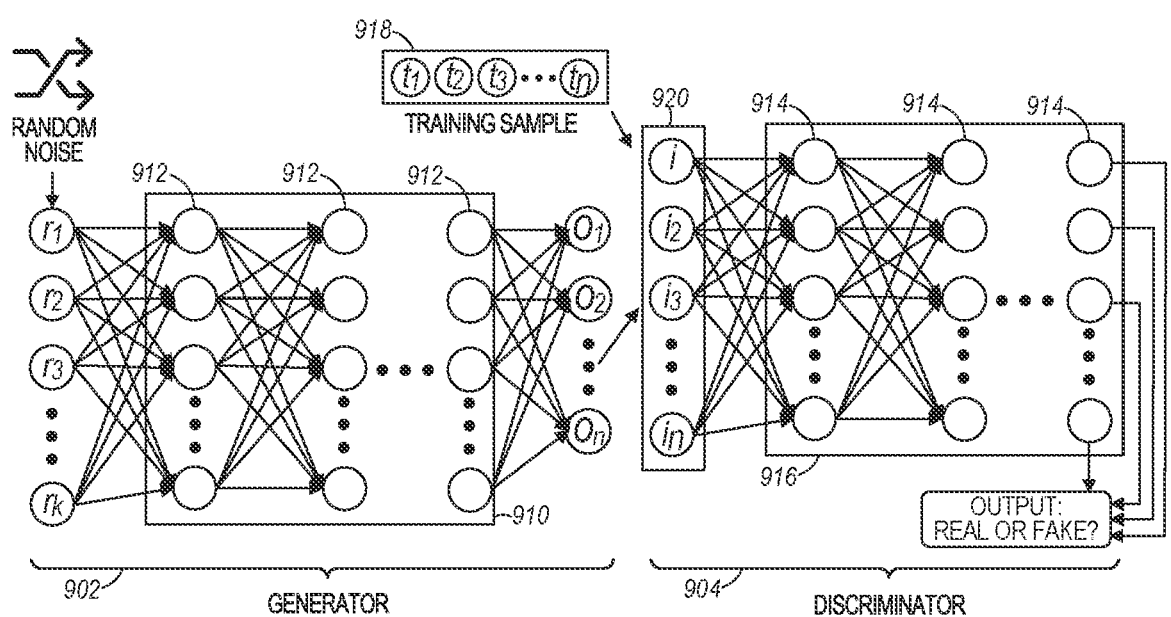
FIG. 9 illustrates more details of a generative adversarial network model, according to an example embodiment.

Referring back to FIG. 6, the training service 650 may also train one or more GAN models. FIG. 9 illustrates an example GAN architecture composed of two sub-networks including a generator 902 that attempts to create realistic-looking training samples and a discriminator 904 which attempts to distinguish between real and fake samples. During each training step, the generator layers 910 may construct a vector representation of campaign settings from a sample of random noise (e.g., a composite vector determined for a random set of campaign configuration settings) using the weights of the hidden generator units 912. During each training epoch, the generator 902 is configured to determine a constructed vector representation for each composite vector included in the training sample. To train the weights of the hidden generator units 912, a loss value measuring the difference between the constructed vector representations and the composite vectors is calculated using a loss function. If the loss value exceeds a predetermined loss threshold, the weights of the hidden generator units 912 are modified based on the measured loss value (e.g., adjusted in the direction of a gradient determined from the loss value) to update the generator 902. One or more additional training epochs are performed by the updated generator 902 and the new constructed vector representations determined by the updated generator 902 are compared to the composite vectors in the training sample. The generator network 902 is re-trained using this process until the loss value is within the predetermined loss threshold.

If the loss value does not exceed a predetermined loss threshold, the trained generator 902 may be used to train the discriminator 904. The generator 902 may generate a number of constructed vector representations that matches the number of composite vectors in a training sample 918. The constructed vector representations output by the generator 902 and the composite vectors may be combined to generate a discriminator training sample. During each training step, a constructed vector representation is input into the visible layer 920 of the discriminator 904 along with a composite vector from the training sample 918. The discriminator layers 916 of the discriminator 904 may distinguish between the "real" data (e.g., the composite vector) and "fake" data (e.g., the constructed vector representation from the generator 902) based on weights of the discriminator hidden units 914. The performance of the discriminator 904 may be determined using loss function that calculates a loss value observed for each pair of constructed vector representations and composite vectors included in the discriminator training sample. The loss value may measure the accuracy of the "real" and "fake" classifications made by the discriminator 904 over the complete discriminator training sample. If the loss value is below a predetermined accuracy threshold, the weights of the hidden discriminator units 914 of the discriminator layers 916 may be modified to minimize the loss value (e.g., the weights may be adjusted in the direction of a gradient determined from the loss value) to update the discriminator 904. One or more additional training epochs may be performed by the updated discriminator 904 and the accuracy of the new classifications made by the updated discriminator may be determined using the loss function. The discriminator 904 may be re-trained using this process until the loss value is within the predetermined accuracy threshold. If the loss value does not exceed a predetermined accuracy threshold, the trained discriminator may be used to identify anomalies in target campaigns by determining if the encoded campaign configuration settings are "real" (i.e., not anomalous) or "fake" (i.e., anomalous).

At runtime, only the trained discriminator 904 is used to identify anomalies. To determine if a media campaign is anomalous, a composite vector encoding the campaign configuration settings for a target campaign is generated by the feature generator and input into the visible layer 920 of the discriminator 904. The discriminator layers 914 classify the campaign settings encoded in the composite vector as "real" or "fake" based on the trained model weights of the hidden discriminator units 916. Composite vectors that are classified by the discriminator 904 as "fake" are predicted by the DBN model to include an anomaly and composite vectors that are classified as "real" are predicted to be successful and therefore not anomalous.

Referring back to FIG. 6, the training service 650 may use the trained weights 652 determined during the training processes to construct one or more machine learning models

660 that are deployed to production. An anomaly prediction component 664 may leverage the machine learning models 660 to identify configuration settings of target campaigns that likely include an anomaly. In various embodiments, the anomaly prediction component 664 may review each campaign that is configured on the publication system. In various embodiments, the anomaly prediction component 664 may interference one or more of the machine learning models 660 to review campaign settings in real time as soon as each campaign setting is input into the configuration interface. To provide real time review of campaign settings, each time a configuration setting is entered into the configuration interface, the anomaly prediction component 664 may determine a composite vector encoding all of the configuration settings entered so far for a campaign. The anomaly prediction component 664 may inference one or more of the machine learning models 660 on each composite vector to review the settings entered up to that point for anomalies. During the configuration process, the size of the composite vector generated by the anomaly prediction component 664 may grow until all of the configuration settings for the campaign are encoded.

The anomaly prediction component 664 may communicate identified anomalies to the publication system in real time so the publication system may dynamically provide error messages that identify anomalous campaign settings. The error messages may be displayed in the configuration interface as online users are configuring campaigns. The error messages may include a prompt to correct the identified anomalous campaign settings to enable online users to dynamically adjust configuration settings that will cause the campaign to fail before the campaign is deployed. The error message may also include suggested values for the anomalous campaign settings. The suggested values may correspond to values for the anomalous settings that are identified by one or more of the machine learning models 660 as likely to appear in successful campaigns. The anomaly prediction component 664 may inference one or more of the machine learning models 660 to check the adjusted configuration settings in real time to ensure the identified anomaly is resolved by the adjustments and, if not, provide a follow up error message.

The anomaly prediction component 664 may also review campaign configuration settings after the initial campaign setup process is complete (e.g., after all of the configuration settings for a campaign have been entered into the configuration interface) and before the campaign begins running on the publication system. Reviewing the fully configured campaigns before they are deployed ensures that only campaigns that are likely to succeed will begin running on the publication system.

In various embodiments, the anomaly prediction component 664 may determine if the configuration settings of a media campaign include an anomaly using one of the machine learning models (e.g., model A 662A). The anomaly prediction component 664 may also use multiple machine learning models (e.g., model A, model B, and model C) to detect anomalies in campaign configuration settings with greater accuracy. For example, a DBN model, an OCD-SVDD model, and a GAN model may be combined into an ensemble model that produces a combined anomaly prediction that leverages the collective anomaly detection capacity of each model. In various embodiments, the anomaly predictions determined by the DBN, OCD-SVDD, and GAN models may be combined into a composite anomaly prediction using a weighted voting process.

To generate a composite anomaly prediction using the weighted voting process, the prediction accuracy of each model may be determined by evaluating a test sample including configuration settings for completed campaigns. The test sample may include completed campaigns that were successful and completed campaigns that were unsuccessful. The number of correct predictions (e.g., "not anomalous" predictions for successful campaigns and "anomalous" predictions for unsuccessful campaigns) for each campaign in the test sample may be determined and each model's accuracy may be the ratio of successful predictions to total predictions. The measured accuracy for each model on the test sample may be stored as voting weights 654 that may be used in the weighted voting process. At runtime, each model generates a prediction (e.g., "not anomalous" or "anomalous") for a target campaign (e.g., a newly created media campaign that was configured using the configuration interface of the publication system). The predictions generated by each model are then weighted according to the voting weights (e.g., by the prediction accuracy of each model) and the weighted predictions are aggregated to form a composite prediction.

For example, each model may generate an anomaly occurrence probability (e.g., a numerical value between −1 and 1) for the campaign being reviewed. The anomaly occurrence probabilities may be compared to an anomaly threshold to generate a prediction (e.g., values <0 are classified as "not anomalous" and values >0 are classified as "anomalous"). The anomaly occurrence probabilities for each model are then multiplied by the corresponding voting weight 654 for each model. Predictions generated by models that have a higher accuracy are multiplied by a larger weight and predictions generated by models that have a lower accuracy are multiplied by a smaller weight. For example, the values for the configuration settings of a media campaign generated by a GAN model, OCD-SVDD model, and a DBN model may be −0.8, 0.6, and 0.7 respectively. The weights of the GAN, OCD-SVDD, and DBN models may be 0.5, 0.8, and 0.9 respectively because the GAN model has the lowest prediction accuracy of the three models and the DBN model as the highest prediction accuracy. Accordingly, the weighed predictions for each model may be −0.4, 0.48, and 0.56 respectively. These values are then combined to generate a numerical value of 0.64 and an "anomalous" prediction based on the anomaly threshold described above.

In various embodiments, the voting weights 654 for the weighted voting process may be updated based on new data collected by the publication system. New test samples including the most recent successful and unsuccessful campaigns run on the publication system may be assembled regularly at a defined time period (e.g., in real time, daily, monthly, and the like). The trained anomaly detection models may generate anomaly predictions for the new test samples and update voting weights may be determined based on the model's prediction accuracy so that the voting weights used in the weighted voting process are dynamic and based on the most current campaigns that are run on the publication system.

In various embodiments, the trained weights 652 for the machine learning models 660 and the model weights 654 for the weighted voting process may be fine tuned based on real world data collected by the publication system. For example, the trained weights 652 and/or model weights may be fine-tuned based on a target anomaly detection rate that specifies a desired frequency of anomaly detection for campaigns. An anomaly detection rate of 5% may configure the ensemble model to detect anomalies in 5% (e.g., 5 out of every 100) of target campaigns reviewed by the anomaly detection system. The anomaly detection rate may be adjusted based on a number of unsuccessful campaigns that make it past the anomaly detection system and end up running on the publication system and the amount of time online users spend configuring campaigns in the configuration interface. For example, the measured unsuccessful rate for campaigns over a defined time period may be compared to a target unsuccessful rate (e.g., 0.1%). If the measured unsuccessful rate over a defined time period (e.g., 22 unsuccessful campaigns out of 10,000 completed campaigns over a 3 day period or 0.22%) exceeds the target unsuccessful rate, the anomaly detection rate may be increased to prevent more unsuccessful campaigns from being deployed. The target anomaly detection rate may also be adjusted based on a comparison between a target average configuration time and the measured average configuration time observed for a campaigns over a period of time. For example, if the target average configuration time is 2 minutes and 30 seconds and the measured average configuration time for 10,000 completed campaigns over a 3 day period is 3 minutes and 10 seconds, the anomaly detection rate may be decreased to speed up the configuration time for online users of the publication system.

To fine tune the trained weights 652, the training service 650 may retrain the machine learning models 660 to optimize the models 662A, . . . , 662N for a defined target anomaly detection rate. To retrain the models 662A, . . . , 662N the training service 650 may generate anomaly predictions for a test sample of completed campaigns run on the publication system. A loss function for the target detection rate may calculate a loss value that measures the difference between the predicted anomaly detection rate (e.g., the ratio of predicted anomalous campaigns to predicted non-anomalous campaigns). The trained weights of each of one or more of the models 662A, . . . , 662N may be adjusted to minimize the loss value. For example, the trained weights 652 of the coefficients of the object function of the OCD-SVDD model, the trained weights of the hidden units of the DBN model, and the trained weights of the hidden discriminator units of the GAN model may be adjusted in the direction of the loss by a magnitude equal to a gradient determined based on the magnitude of the loss value. The updated trained weights 652 may be used to update the respective models 662A, . . . , 662N and the detection rate of the updated models for the test sample may be measured and compared to the target detection rate. The re-training process may be repeated until the updated models detect anomalies within a threshold difference (e.g., +/−0.5%) with respect to the target detection rate.

Voting weights 654 may also be fine-tuned to by re-training the ensemble model to optimize the model for the target anomaly detection rate. To fine-tune the voting weights 654, the anomaly detection rate of the ensemble model may be determined for a test sample including a pre-determined number (e.g., 100) of campaigns that ran on the publication system. A loss function for the ensemble detection rate may be used to determine a loss value that measures the difference between the target and predicted detection rates. The voting weights 654 for the weighted voting process may be adjusted to minimize the loss value. For example, the voting weights 654 may be adjusted in the direction of the loss value by a magnitude that corresponds to a gradient determined based on the magnitude of the loss value. The adjusted voting weights 654 may be used to update the ensemble model and the predicted detection rate of the updated ensemble model for the test sample may be measured and compared to the target detection rate. The re-training process may be repeated until the updated ensemble models detect anomalies within a threshold difference (e.g., +/−0.5%) with respect to the target detection rate.

Fine tuning the trained weights 652 and voting weights 654 by retraining the models 662A, . . . , 662N and ensemble model enables respectively enables the anomaly detection system to be configured in a way that minimizes the number of unsuccessful media campaigns and campaign configuration time while also reducing the number of false positives and enhancing the user experience of the campaign setup process within the publication system.

The ensemble model may also be fine-tuned to specialize in detecting anomalies in particular types of media campaigns. The campaigns 622A, . . . , 622N included in input data 620 may be filtered on one or more of the configuration settings 624, optimization model 626, and/or campaign outcomes 628 to assemble specific training dataset that are used to train the specialized models. The specialized models may be trained and/or tested on a variety of data sets including campaigns having different characteristics. For example, to test the prediction accuracy of the ensemble models on different types of campaigns, test samples may be generated that include configuration settings of particular types of campaigns. For example, test samples may include configuration settings for campaigns having a minimum total budget, campaigns that target individuals within a certain demographic or financial situation, campaigns that optimize click rate or using another type of optimization model, and the like. A set of campaign specific voting weights 654 to use in the weighted voting process may be determined based on the prediction accuracy of each of the models for each of the test samples.

To generate the specialized ensemble models, the anomaly prediction component 664 may load a set of campaign specific voting weights 654 that correspond to one or more of the characteristics of a target campaign being reviewed by the anomaly detection system. For example, the set of campaign specific voting weights 654 determined for a test sample of campaigns having a minimum budget of more that one million dollars may be used each time the anomaly prediction component 664 reviews a target campaign having a total budget in excess of a million dollars. The anomaly prediction component 664 may perform the weighted voting process using the appropriate campaign specific voting weights 654 to ensure the predictions are weighted according to each model's predication accuracy for a particular type of campaign instead of the model's general accuracy across all campaigns. This process of using different sets of campaign specific voting weights 654 to generate the combined prediction leverages the ability of different machine learning models to specialize in different types of problems and reduces the likelihood of inaccurate predictions caused by a drop in accuracy of one or more of the models when detecting anomalies in particular types of campaign or anomalies caused by particular combinations of campaign settings.

The anomaly prediction component 664 may also identify the individual campaign settings or combination of settings that cause the anomaly based on one or more outputs of the machine learning models 660. For example, a reconstructed representation of the media campaign input into the DBN model may be used to identity individual configuration settings of the input campaign that contribute to the campaign anomaly. The reconstructed representation of the input media campaign may be an n-dimensional representation of the features of the input media campaign generated from a joint probability distribution of campaign settings determined during the DBN model's process for predicting whether the input media campaign includes an anomaly. The trained hidden layers of the DBN model may output the n-dimensional representation of the configuration settings of the input campaign in the visible layer of the model. The n-dimensional representation may be a feature vector that includes numerical values for each of the configuration settings included in the feature vector for the input media campaign. The numerical values in the reconstructed n-dimensional representation may be determined based on the marginal distributions (e.g., the distributions of each of the individual variables) and conditional probability distributions for each configuration setting that are encoded in the joint probability distribution. Accordingly, the campaign settings shown in the visible layer of the trained DBN model are selected based on the probability each setting occurs in the anomalous campaign individually and jointly in combination with the other campaign settings.

The anomaly prediction component 664 may identify anomalous campaign settings by determining the probability of seeing each feature of the input anomalous media campaign in the reconstructed representation shown in the DBN visible layer. The anomaly prediction component 664 may then iterate over the visible layer to find the setting or combination of settings with the highest probability of appearing in the anomalous campaign. For example, the anomaly prediction component 664 may determine the probability each of the input campaign configuration settings appears in the reconstructed representation. The probabilities for each of the configuration settings may then be compared to a detection threshold and each setting that has a probability above the detection threshold may be identified as contributing to the anomaly. The anomaly prediction component 664 may also identify the configuration setting with the highest probability of appearing in the visible layer as the campaign setting the causes the anomaly. For each campaign that is predicted to include an anomaly, the anomaly prediction component 664 may identify the configuration setting or combination of settings that contributes to the anomaly using the process described above. Campaign optimization logic 608 may then cause the anomaly prediction component 664 to provide the identified configuration settings to the publication system so that the identified settings may be flagged within the campaign setup user interface.

The campaign optimization logic 608 may also cause the publication system to generate an error message that explains the one or more of the identified settings that include an error and need to be corrected. The publication system may also leverage campaign optimization logic 608 to suggest a new value for the identified configuration settings that would resolve the anomaly. The suggested new values may be one or more pre-determined default values for the identified campaigns defined in the campaign optimization logic 608. The suggested new values may also be determined programmatically by the anomaly prediction component 664 according to one or more processes implemented in the campaign optimization logic 608. For example, the anomaly prediction component 664 may determine the suggested new values by identifying the value for each of the identified campaign settings that has the lowest probability of appearing in the visible layer of reconstructed anomalous campaign configuration settings generated the DBN model or selecting any value for the identified campaigns (e.g., the closest value to the original value) that has a lower probability of appearing in the visible layer than the original value.

The campaign optimization logic 608 may configure the publication system to display the error message and/or the suggested values adjacent to each of the identified settings within the campaign setup user interface. The publication system may also be configured to prevent the campaign from running until all of the identified configuration settings are corrected either manually within the campaign setup user interface or automatically by the publication system. For example, the campaign optimization logic 608 may configure the publication system to automatically adjust the identified campaign settings to resolve the anomaly in response to a user request for automatic correction received in the campaign setup user interface, the expiration of a pre-determined period of time after the campaign was initially configured, or some other trigger.

Figure 10:
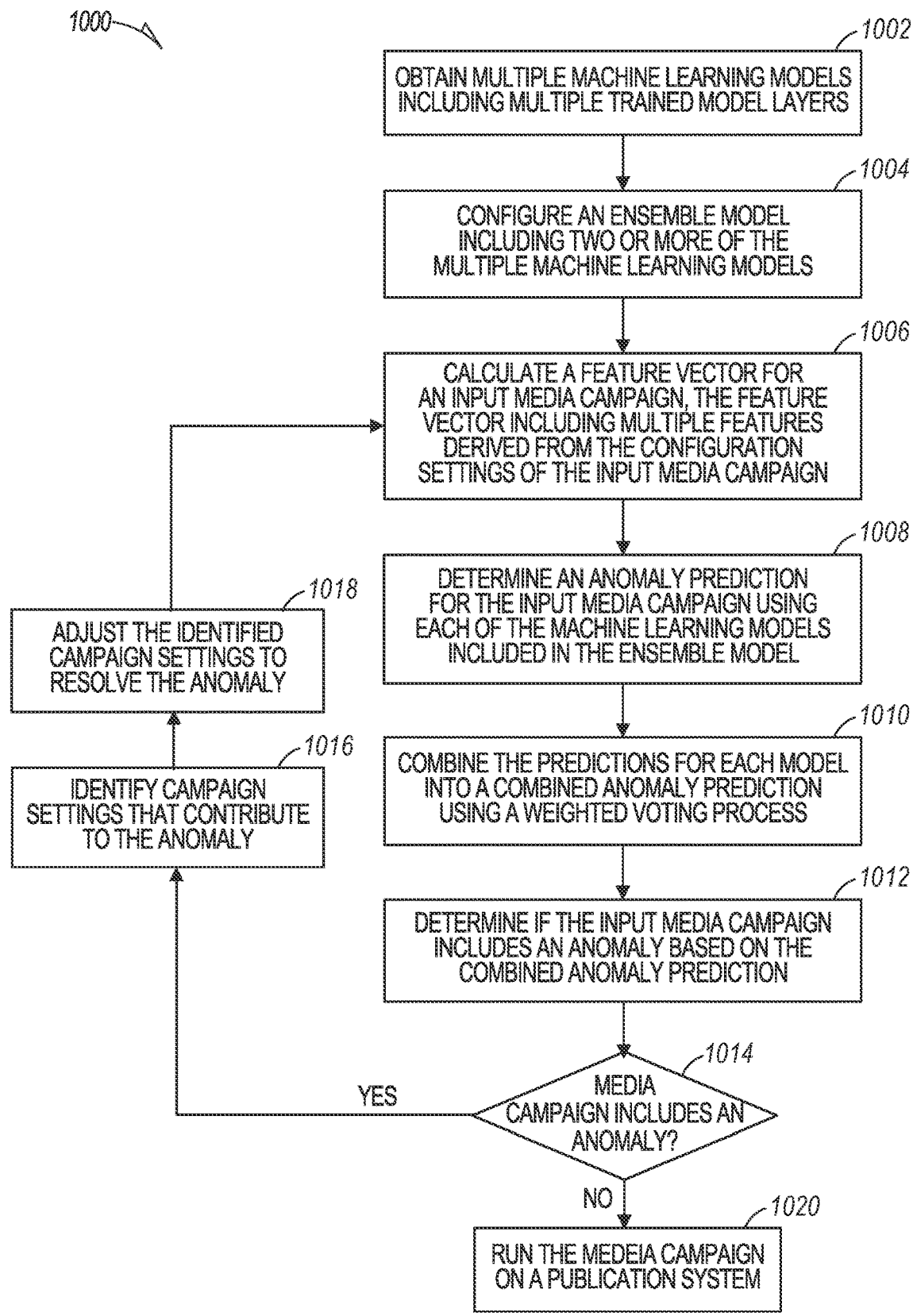
FIG. 10 is a flow chart depicting operations in a method, according to an example embodiment.

Some present examples also include methods. FIG. 10 is a block diagram of a process 1000 of detecting anomalies in media campaign configuration settings. At 1002, the anomaly detection system obtains multiple machine learning models with each model including multiple trained model layers. The machine learning models may include one or more deep learning models, for example, DBN models, GAN models, OCD-SVDD models, and the like. The machine learning models may be trained by a training service using training data including feature vectors generated by a feature generator as described above in association with FIG. 6.

At 1004, two or more of the machine learning models may be combined to form an ensemble model. The ensemble model may improve the accuracy of anomaly predictions made by the individual machine learning models by combining the predictions from multiple models into a combined prediction. An anomaly detection component may configure the ensemble model to generate the combined prediction using a weighted voting process that weighs each prediction generated by a model in the ensemble by the model's prediction accuracy. The set of weights used in the weighted voting process may be fine-tuned using real world data and/or different campaign specific weights for different types of media campaigns reviewed by the ensemble model.

At 1006, the feature generator may calculate a feature vector for an input media campaign. The feature vector may include multiple encoded features and multiple normalized features that are derived from the configuration settings of the input media campaign. At 1008, each of the machine learning models included in the ensemble model may determine an anomaly prediction for the input campaign. At 1010, the anomaly prediction component combines the predictions for each model into a combined anomaly prediction using the weighted voting process. At 1012, the combined anomaly prediction is used to determine if the media campaigns settings for the input media campaign include an anomaly.

If the combined prediction indicates the media campaign configuration settings include an anomaly (yes at 1014), outputs from one or more of the machine learning models may be used to identify the campaign setting or combination of settings that contributes to the anomaly at 1016. For example, a joint probability distribution generated by the trained hidden layers of the DBN model may be used to identify the campaign settings that contribute to the anomaly. The identified settings may then be flagged in a campaign setup user interface of the publication system. For example, an error message or notification indicating the anomalous settings may be displayed adjacent to each of the identified settings within the campaign setup user interface. At 1018, the identified settings may be adjusted to resolve the anomaly. The identified settings may be adjusted manually within the campaign setup user interface by a user of the publication system or automatically by the publication system. Steps 1006-1014 may be repeated to determine if the modified media campaign includes an anomaly and iterations of identifying anomalous campaign settings, adjusting the settings that contribute to the anomaly, and predicting whether the modified configuration settings include an anomaly may be repeated until the ensemble model indicates the campaign configuration settings do not include an anomaly. If the combined prediction indicates the configuration settings do not include an anomaly (no at 1014), the media campaign may be run on the publication system at 1020.

In various embodiments other methods may include encoding one or more configuration settings for a campaign in a composite vector using an encoder, the composite vector being representative of at least a portion of the configuration settings; generating a composite vector for multiple campaigns to create a set of composite vectors; aggregating the set of composite vectors to generate an output of the encoder, the output including a training sample for modeling; transmitting the output of the encoder to a training model for training multiple anomaly detection machine learning models; selecting two or more of the trained anomaly detection machine learning models to include in an ensemble model; and using the ensemble model to determine an anomaly occurrence probability for one or more configuration settings of a target campaign.

In various embodiments, the multiple anomaly detection machine learning models include a least one deep learning model. In various embodiments the methods further comprise determining a composite vector for the target campaign, the composite vector begin representative of at least a portion of the configuration settings of the target campaign. In various embodiments the methods further comprise using each of the two or more trained models to determine an anomaly occurrence probability for one or more of the configuration settings of the target campaign; and using a weighted voting process to aggregate the anomaly occurrence probabilities determined by the two or more trained models to generate a composite anomaly occurrence probability for the one or more configuration settings of the target campaign.

In various embodiments, the composite vector for the target campaign includes normalized features determined for one or more numeric configuration settings and encoded features determined from one or more categorical configuration settings. In various embodiments, the methods further comprise determining the anomaly occurrence probability by determining a numerical probability that the target campaign includes an anomaly and comparing the numerical probability to an anomaly threshold. In various embodiments, the methods further comprise performing the weighted voting process by multiplying the anomaly occurrence probability determined by each of the trained models by a voting weight determined based on an anomaly detection accuracy of each of the trained models measured for a test sample of completed campaigns.

In various embodiments the methods further comprise identifying an anomaly based on the anomaly occurrence probability for one or more configuration settings of the target campaign; and identifying the one or more configuration settings that contribute to the anomaly using an output of one or more of the trained models. In various embodiments, the output used to identify the configuration setting that contribute to the anomaly includes a joint probability distribution determined from the output by one or more layers of at least one of the trained models. In various embodiments, the methods further comprise displaying an error message that includes the identified one or more configuration settings that contribute to the anomaly.

In this disclosure, the following definitions may apply in context. A "Client Device" or "Electronic Device" refers to any machine that interfaces to a communications network to obtain resources from one or more server systems or other client devices. A client device may be, but is not limited to, a mobile phone, desktop computer, laptop, portable digital assistant (PDA), smart phone, tablet, ultra-book, netbook, laptop, multi-processor system, microprocessor-based or programmable consumer electronic system, game console, set-top box, or any other communication device that a user may use to access a network.

"Communications Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component" (also referred to as a "module") refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component includes a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. An anomaly detection system comprising:
   one or more processors; and
   a memory storing instructions that, when executed by at least one processor in the one or more processors, cause the at least one processor to perform at least the following operations:
   encode one or more configuration settings for a campaign in a composite vector using an encoder, the composite vector being representative of at least a portion of the configuration settings;
   generate a composite vector for multiple campaigns to create a set of composite vectors;
   aggregate the set of composite vectors to generate an output of the encoder, the output including a training sample for modeling;
   transmit the output of the encoder to a training model for training multiple anomaly detection machine learning models;
   select two or more of the trained anomaly detection machine learning models to include in an ensemble model; and
   use the ensemble model to determine an anomaly occurrence probability for one or more configuration settings of a target campaign.

2. The system of claim 1, wherein the multiple anomaly detection machine learning models include a least one deep learning model.

3. The system of claim 1, wherein the one or more processors are further configured to determine a composite vector for the target campaign, the composite vector being representative of at least a portion of the configuration settings of the target campaign.

4. The system of claim 1, wherein the at least one processor is further configured to use each of the two or more trained models to determine an anomaly occurrence probability for one or more of the configuration settings of the target campaign; and
   use a weighted voting process to aggregate the anomaly occurrence probabilities determined by the two or more trained models to generate a composite anomaly occurrence probability for the one or more configuration settings of the target campaign.

5. The system of claim 3, wherein the composite vector for the target campaign includes normalized features determined for one or more numeric configuration settings and encoded features determined from one or more categorical configuration settings.

6. The system of claim 1, wherein the two or more trained models determine the anomaly occurrence probability by determining a numerical probability that the target campaign includes an anomaly and comparing the numerical probability to an anomaly threshold.

7. The system of claim 4, wherein the weighted voting process multiples the anomaly occurrence probability determined by each of the trained models by a voting weight determined based on an anomaly detection accuracy of each of the trained models measured for a test sample of completed campaigns.

8. The system of claim 1, wherein the at least one processor is further configured to identity an anomaly based on the anomaly occurrence probability for one or more configuration settings of the target campaign; and
   identity the one or more configuration settings that contribute to the anomaly using an output of one or more of the trained models.

9. The system of claim 8, wherein the output used to identify the one or more configuration settings that contribute to the anomaly includes a joint probability distribution determined from the output by one or more layers of at least one of the trained models.

10. The system of claim 8, wherein the at least one processor is further configured to display an error message that includes the identified one or more configuration settings that contribute to the anomaly.

11. A method of anomaly detection in media campaign configuration settings, the method comprising:
    encoding one or more configuration settings for a campaign in a composite vector using an encoder, the composite vector being representative of at least a portion of the configuration settings;
    generating a composite vector for multiple campaigns to create a set of composite vectors;
    aggregating the set of composite vectors to generate an output of the encoder, the output including a training sample for modeling;
    transmitting the output of the encoder to a training model for training multiple anomaly detection machine learning models;
    selecting two or more of the trained anomaly detection machine learning models to include in an ensemble model; and using the ensemble model to determine an anomaly occurrence probability for one or more configuration settings of a target campaign.

12. The method of claim 11, wherein the multiple anomaly detection machine learning models include a least one deep learning model.

13. The method of claim 11, further comprising determining a composite vector for the target campaign, the composite vector being representative of at least a portion of the configuration settings of the target campaign.

14. The method of claim 11, further comprising using each of the two or more trained models to determine an anomaly occurrence probability for one or more of the configuration settings of the target campaign; and using a weighted voting process to aggregate the anomaly occurrence probabilities determined by the two or more trained models to generate a composite anomaly occurrence probability for the one or more configuration settings of the target campaign.

15. The method of claim 11, wherein the composite vector for the target campaign includes normalized features determined for one or more numeric configuration settings and encoded features determined from one or more categorical configuration settings.

16. The method of claim 11, further comprising determining the anomaly occurrence probability by determining a numerical probability that the target campaign includes an anomaly and comparing the numerical probability to an anomaly threshold.

17. The method of claim 14, further comprising performing the weighted voting process by multiplying the anomaly occurrence probability determined by each of the trained models by a voting weight determined based on an anomaly detection accuracy of each of the trained models measured for a test sample of completed campaigns.

18. The method of claim 11, further comprising identifying an anomaly based on the anomaly occurrence probability for one or more configuration settings of the target campaign; and identifying the one or more configuration settings that contribute to the anomaly using an output of one or more of the trained models.

19. The method of claim 18, wherein the output used to identify the one or more configuration settings that contribute to the anomaly includes a joint probability distribution determined from the output by one or more layers of at least one of the trained models.

20. The method of claim 18, further comprising displaying an error message that includes the identified one or more configuration settings that contribute to the anomaly.

* * * * *